(12) United States Patent
Takahashi et al.

(10) Patent No.: US 10,906,186 B2
(45) Date of Patent: Feb. 2, 2021

(54) ROBOT HAND DEVICE AND CARRIER APPARATUS USING THE ROBOT HAND DEVICE

(71) Applicant: Kabushiki Kaisha Toshiba, Minato-ku (JP)

(72) Inventors: Hiromasa Takahashi, Minato (JP); Noriyuki Ooba, Yokohama (JP); Akira Ushijima, Yokohama (JP); Emiko Ishida, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 240 days.

(21) Appl. No.: 15/694,408

(22) Filed: Sep. 1, 2017

(65) Prior Publication Data
US 2018/0079082 A1    Mar. 22, 2018

(30) Foreign Application Priority Data
Sep. 20, 2016   (JP) .................. 2016-183274

(51) Int. Cl.
*B25J 9/00*    (2006.01)
*B25J 9/16*    (2006.01)
(Continued)

(52) U.S. Cl.
CPC ......... *B25J 9/1697* (2013.01); *B25J 15/0014* (2013.01); *B25J 15/0616* (2013.01);
(Continued)

(58) Field of Classification Search
CPC .. B25J 9/1697; B25J 15/0014; B25J 15/0616; B25J 9/1687; G05B 2219/45056; G05B 2219/40006
See application file for complete search history.

(56) References Cited

U.S. PATENT DOCUMENTS 3,930,587 A    1/1976  Bliss
5,190,430 A *  3/1993  Neri ..................... B65B 43/185
                                                414/412
(Continued)

FOREIGN PATENT DOCUMENTS

CN    102257292 A    11/2011
JP       48-2675       1/1973
(Continued)

OTHER PUBLICATIONS

NPL JPO English Translate for JPS48-2675 (Year: 1973).*
(Continued)

*Primary Examiner* — Ian Jen
(74) *Attorney, Agent, or Firm* — Oblon, McClelland, Maier & Neustadt, L.L.P.

(57) ABSTRACT

A robot hand device according to an embodiment includes extensible arms which can be extended and shortened, a drive motor, and at least one clutch. The extensible arms support an object to be carried and are capable of being extended and shortened. The drive motor extends and shortens the extensible arms. The at least one clutch are capable of transmitting power of the motor to at least one of the extensible arms selected among the extensible arms to extend and shorten the selected at least one of the extensible arms.

13 Claims, 13 Drawing Sheets

(51) Int. Cl.
*B25J 15/06* (2006.01)
*B25J 15/00* (2006.01)

(52) U.S. Cl.
CPC ... *B25J 9/1687* (2013.01); *G05B 2219/40006* (2013.01); *G05B 2219/45056* (2013.01)

(56) References Cited

U.S. PATENT DOCUMENTS

| | | | | |
|---|---|---|---|---|
| 5,232,332 | A * | 8/1993 | Focke | B65G 61/00 414/744.5 |
| 5,263,813 | A * | 11/1993 | Kiederle | B65G 47/90 294/67.31 |
| 5,564,893 | A * | 10/1996 | Tacchi | B65G 47/902 414/796.9 |
| 5,683,222 | A * | 11/1997 | Ingelhag | B65G 59/023 414/797.2 |
| 5,871,248 | A * | 2/1999 | Okogbaa | B25J 15/00 294/86.4 |
| 5,984,623 | A * | 11/1999 | Smith | B65G 61/00 294/104 |
| 6,652,014 | B2 * | 11/2003 | Schmalz | B65G 47/91 294/65 |
| 8,162,128 | B2 * | 4/2012 | Kimura | H05K 13/0061 198/468.3 |
| 8,162,362 | B2 * | 4/2012 | Braunschweiger | B65G 61/00 294/188 |
| 8,473,094 | B2 * | 6/2013 | Becker | B65G 47/918 294/65 |
| 9,498,887 | B1 * | 11/2016 | Zevenbergen | B65G 47/918 |
| 9,704,126 | B1 * | 7/2017 | Wellman | B25J 9/1612 |
| 9,889,991 | B2 * | 2/2018 | Nakamoto | B65G 13/02 |
| 10,226,865 | B2 * | 3/2019 | Nakayama | B25J 9/1612 |
| 2003/0185656 | A1 * | 10/2003 | Hansl | B65G 1/0435 414/277 |
| 2007/0280812 | A1 * | 12/2007 | Morency | B25J 15/0253 414/729 |
| 2011/0268548 | A1 * | 11/2011 | Doll | B25J 15/00 414/688 |
| 2012/0024091 | A1 * | 2/2012 | Kawabuchi | B25J 18/06 74/37 |
| 2013/0068061 | A1 | 3/2013 | Yoon | |
| 2015/0210472 | A1 * | 7/2015 | Nakamura | B65G 1/0407 414/661 |
| 2015/0344225 | A1 * | 12/2015 | Nakamura | B65G 1/0435 414/273 |
| 2015/0360882 | A1 * | 12/2015 | Girtman | B25J 9/0093 700/213 |
| 2016/0137435 | A1 * | 5/2016 | Tanaka | B25J 15/0014 414/564 |
| 2016/0347558 | A1 * | 12/2016 | Eto | B65G 47/91 |

FOREIGN PATENT DOCUMENTS

| | | |
|---|---|---|
| JP | 59-194998 A | 11/1984 |
| JP | 6-320464 A | 11/1994 |
| JP | 9-255156 A | 9/1997 |
| JP | 2001-130869 A | 5/2001 |
| JP | 2002-173202 A | 6/2002 |
| JP | 2007-130711 A | 5/2007 |
| JP | 5317362 | 10/2013 |
| JP | 5435679 | 3/2014 |
| JP | 2016-94280 | 5/2016 |

OTHER PUBLICATIONS

Combined Chinese Office Action and Search Report dated Apr. 13, 2020, in Patent Application No. 201710768631.1, citing document AO therein, 10 pages (with English Translation of Category of Cited Documents).

* cited by examiner

ROBOT HAND DEVICE AND CARRIER APPARATUS USING THE ROBOT HAND DEVICE

CROSS-REFERENCE TO RELATED APPLICATION

This application is based upon and claims the benefit of priority from the prior Japanese Patent Application No. 2016-183274, filed on Sep. 20, 2016, the entire contents of which are incorporated herein by reference.

FIELD

Embodiments described herein relate to a robot hand device which carries heavy articles and a carrier apparatus using a robot hand device.

BACKGROUND

A carrier apparatus which takes an object to be carried out of a box pallet and carries the object to a predetermined platform is known. The carrier apparatus takes an object to be carried out of the box pallet by a gripping device provided with a suction pad. However, since, for example, a corrugated-board box as an object to be carried is formed of a porous body, it is difficult to increase suction pressure and to carry heavy articles in a technique when such a suction pad is used. The carrier apparatus may be provided with a belt conveyor as means for assisting taking-out and conveyance of an object to be carried. Accordingly, the carrier apparatus causes a problem that it requires much time to take out and carry an object to be carried and the size of the carrier apparatus is increased.

In addition, in production facilities, an extensible robot arm which is formed by connecting a plurality of blocks is used. However, it is difficult to take out and carry heavy articles using such a robot arm.

DETAILED DESCRIPTION

Figure 1:
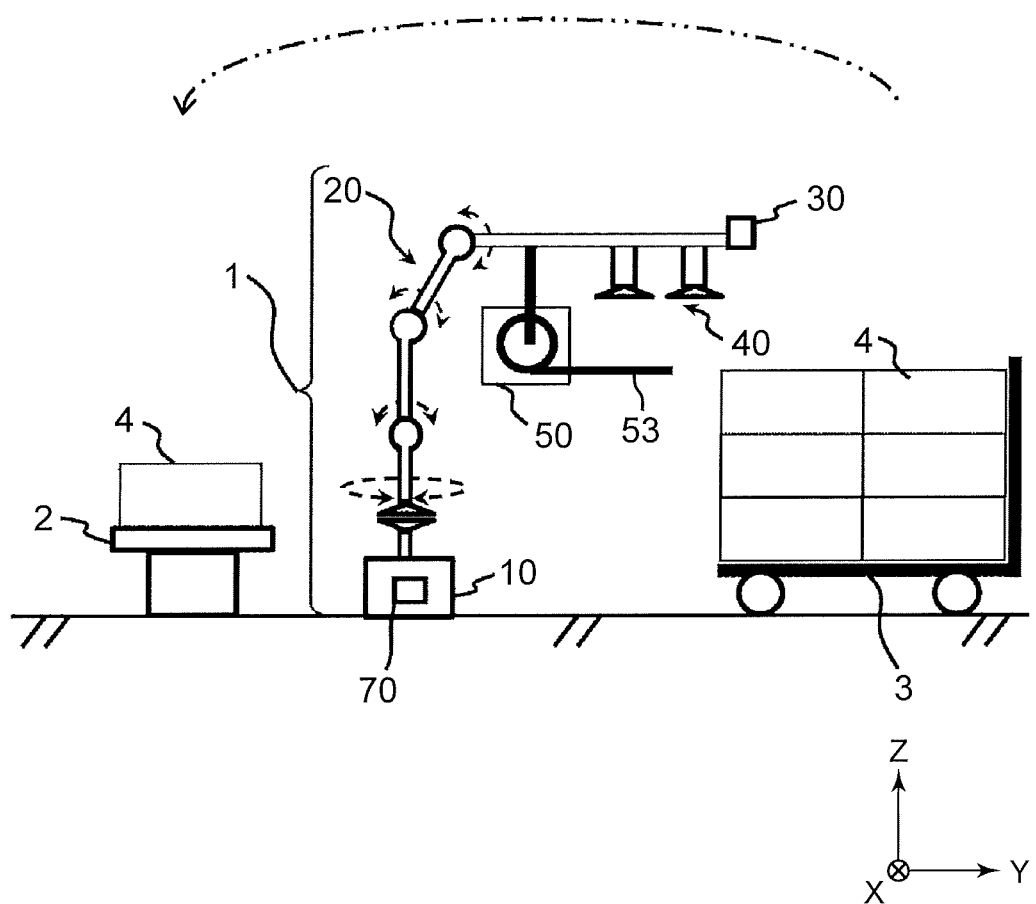
FIG. 1 is a schematic diagram illustrating a carrier apparatus using a robot hand device according to an embodiment.

A robot hand device according to an embodiment includes extensible arms which can be extended and shortened, a drive motor, and at least one clutch. The extensible arms support an object to be carried and are capable of being extended and shortened. The drive motor extends and shortens the extensible arms. The at least one clutch are capable of transmitting power of the motor to at least one of the extensible arms selected among the extensible arms to extend and shorten the selected at least one of the extensible arms.

Hereinafter, further embodiments will be described with reference to the drawings. In the drawings, the same reference numerals denote the same or similar portions respectively.

Figure 2:
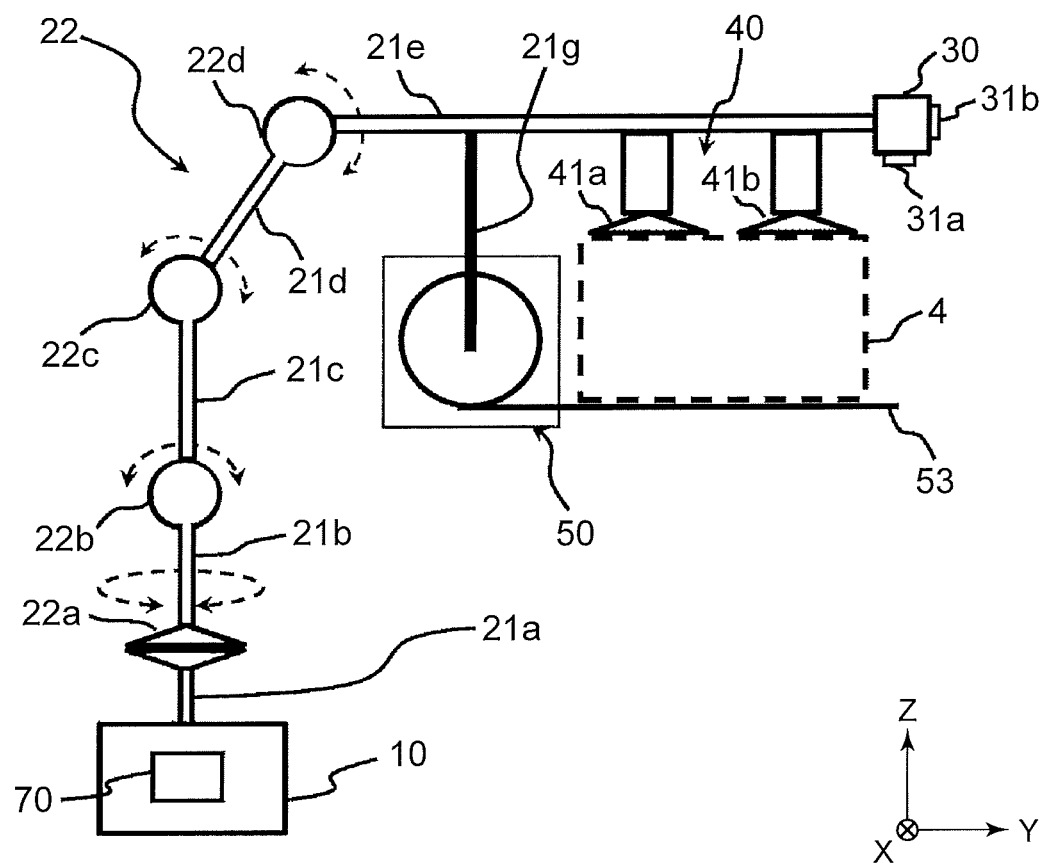
FIG. 2 is an enlarged schematic diagram illustrating the carrier apparatus.

FIGS. 1 and 2 are diagrams schematically illustrating a carrier apparatus using a robot hand device according to an embodiment. In FIG. 1, for the purpose of describing a carrying operation, an object to be carried, a conveying carriage etc. are also illustrated. FIG. 2 is an enlarged view of the carrier apparatus and shows the structure of the carrier apparatus specifically.

In FIG. 1, a carrier apparatus 1 is a carrier robot including a robot hand device 50. The carrier apparatus 1 sequentially holds and takes out eighteen corrugated-board boxes 4, for example, as objects to be carried which are loaded on a conveying carriage such as a box pallet 3. Further, the carrier apparatus 1 carries the corrugated-board boxes 4 which are taken out to a predetermined place or a platform such as a conveyor line 2 from the box pallet 3.

The direction of the width 4$w$ of the corrugated-board box 4 will be referred to as an X direction, the direction of the depth 4$d$ of the corrugated-board box 4 will be referred to as a Y direction, and the direction of the thickness 4$t$ of the corrugated-board box 4 will be referred to as a Z direction. The corrugated-board boxes 4 are loaded on the box pallet 3 so as to have three columns in the X direction, two columns in the Y direction and three rows in the Z direction.

When the corrugated-board boxes 4 are carried by the carrier apparatus 1, the robot hand device 50 puts the corrugated-board boxes 4 on extensible arms 53 having the same structure so as to support the boxes 4 from below, as illustrated in FIG. 2. The extensible arms 53 will be described specifically below. The direction of the width 4$w$ of the corrugated-board box 4 (the X direction) is set to a direction in which the extensible arms 53 having chain-like structure are arranged at regular intervals and in parallel with each other. Other components illustrated in FIGS. 1 and 2 will be described below.

Figure 3:
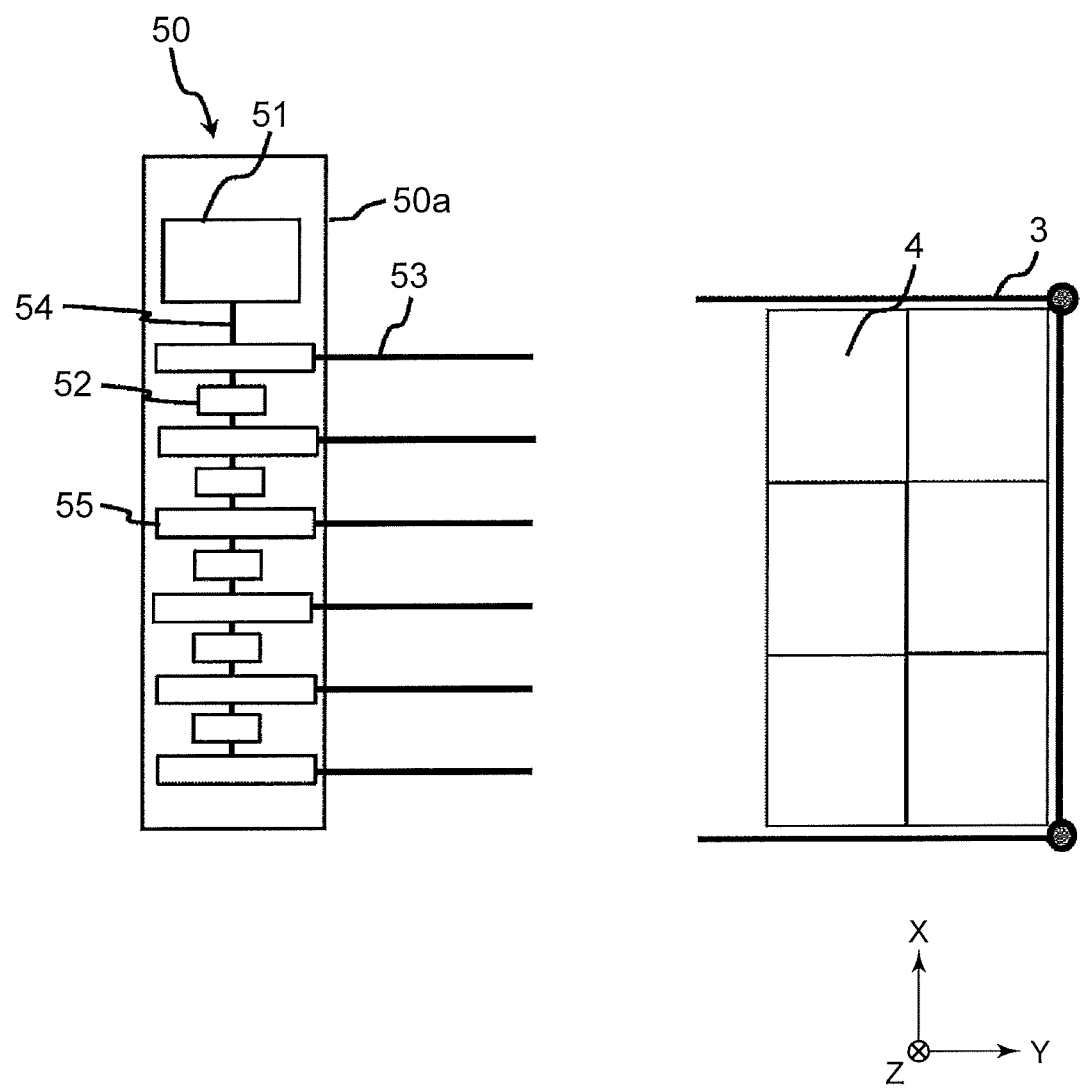
FIG. 3 is a diagram illustrating the structure of the robot hand device seen from the top.

FIG. 3 is a diagram illustrating the structure of the robot hand device 50 seen from the top in FIG. 1. The box pallet 3 and the corrugated-board boxes 4 are also illustrated in FIG. 3. As illustrated in FIG. 3, the robot hand device 50 is provided with the extensible arms 53$a$, a drive motor 51 which drives the extensible arms 53 disposed in a box-shaped body 50$a$, rotating shafts 54, clutches 52 which are used to drive the extensible arms 53, and sprockets 55 which are gears.

The drive motor 51 is a driving power source which generates rotational power and is used to make the extensible arms 53 extend and shorten in the Y direction. The drive motor 51 can be rotated in a normal direction and in a reverse direction. Hereinafter, "rotated in a normal direction and a reverse direction" is simply referred to as "rotated". "Extending of the extensible arms 53" means that the extensible arms 53 extend out of the body 50$a$ of the robot hand device 50. Further, "Shortening of the extensible arms 53" means that the extensible arms 53 are placed into the body 50$a$ of the robot hand device 50 and are placed in the body 50$a$.

For example, the drive motor 51 extends the extensible arms 53 by being rotated in the normal direction, and shortens the extensible arms 53 by being rotated in a reverse direction.

Figure 4:
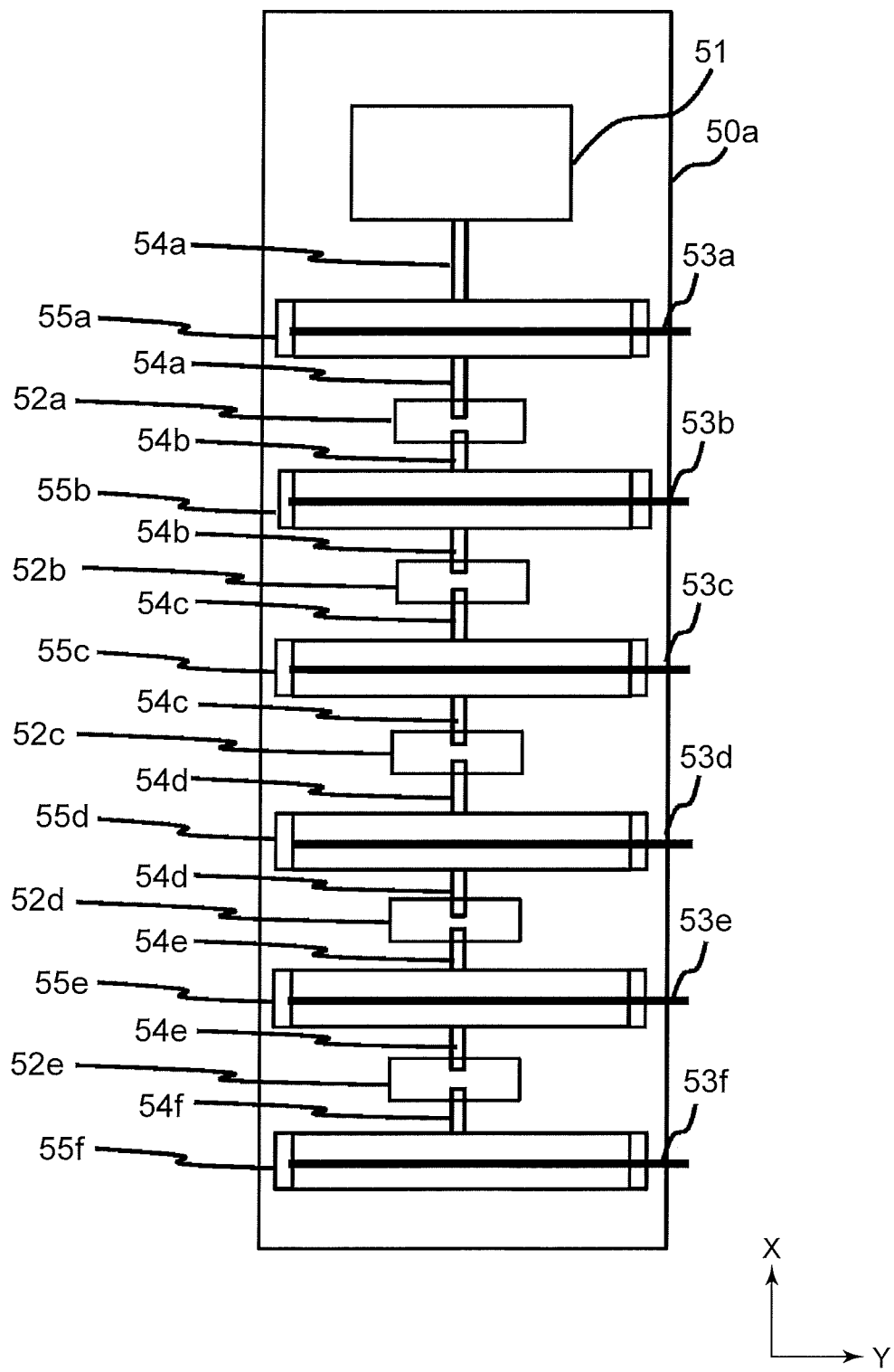
FIGS. 4 to 6 are enlarged diagrams illustrating operation states of the robot hand device seen from the top.
Figure 5:
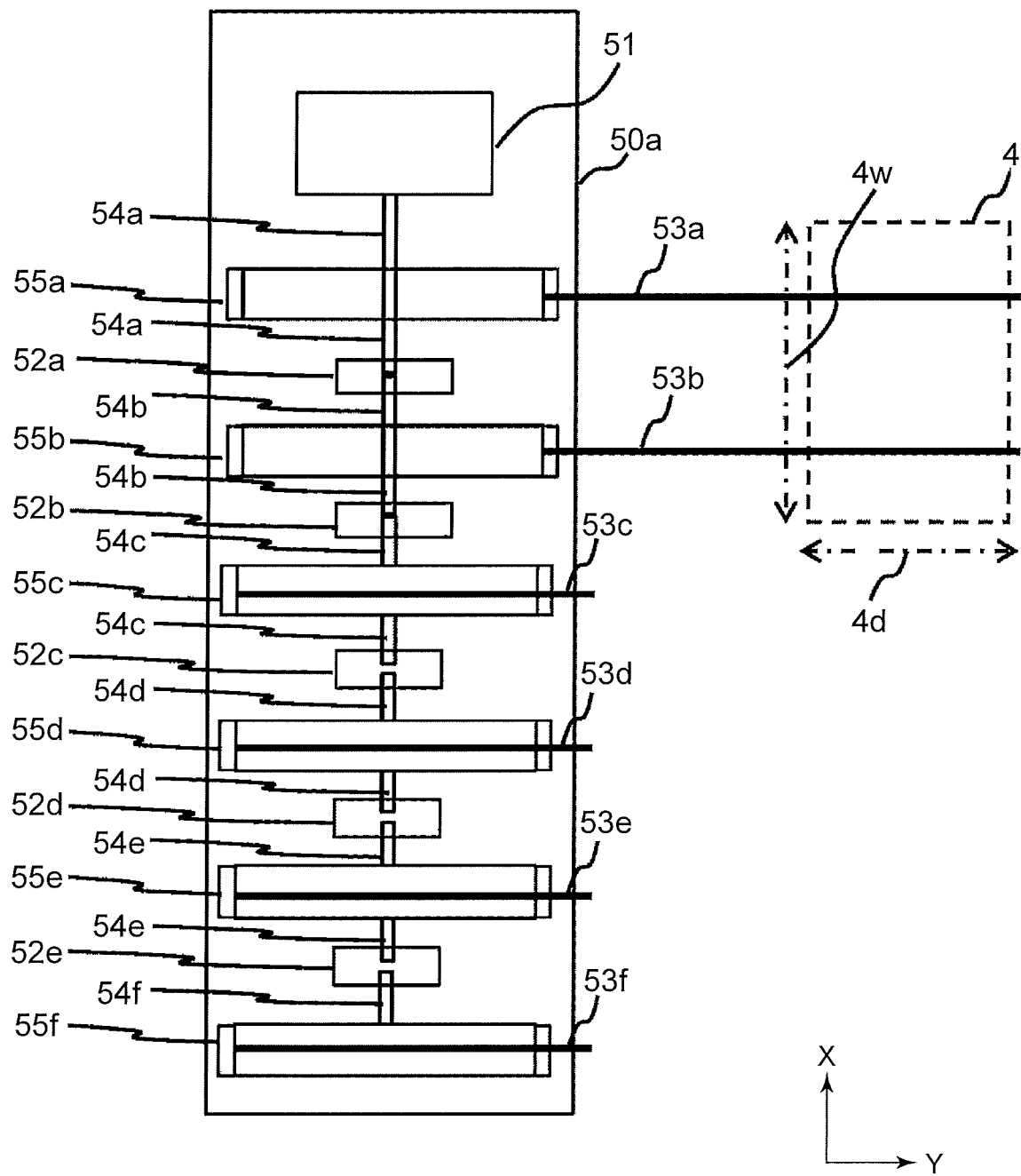
Figure 6:
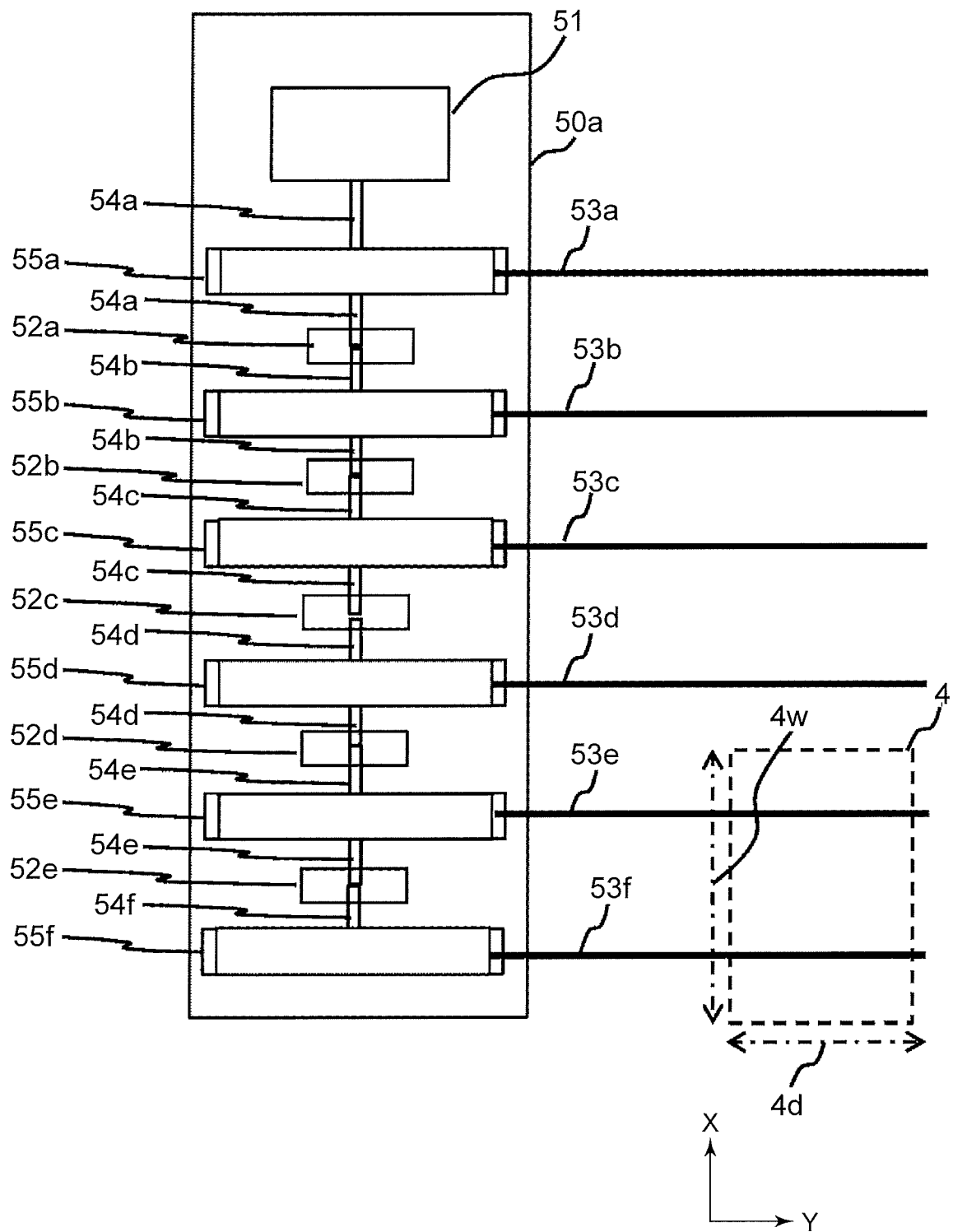

FIGS. 4 to 6 are enlarged diagrams illustrating respective operation states of the robot hand device 50. FIG. 4 illustrates a state in which the extensible arms are placed in the body of the robot hand device 50. FIG. 5 illustrates a state in which the corrugated-board box 4 is supported by two extensible arms. FIG. 6 illustrates a state in which the corrugated-board box 4 is supported by other two extensible arms.

In FIGS. 4 to 6, the rotating shafts 54 of FIG. 3 are shown as a first rotating shaft 54a, a second rotating shaft 54b, a third rotating shaft 54c, a fourth rotating shaft 54d, a fifth rotating shaft 54e, and a sixth rotating shaft 54f. The clutches 52 of FIG. 3 are shown as a first clutch 52a, a second clutch 52b, a third clutch 52c, a fourth clutch 52d, and a fifth clutch 52e respectively having the same structure. The sprockets 55 of FIG. 3 are shown as a first sprocket 55a, a second sprocket 55b, a third sprocket 55c, a fourth sprocket 55d, a fifth sprocket 55e, and a sixth sprocket 55f. The extensible arms 53 of FIG. 3 are shown as a first extensible arm 53a, a second extensible arm 53b, a third extensible arm 53c, a fourth extensible arm 53d, a fifth extensible arm 53e, and a sixth extensible arm 53f.

One end of the first rotating shaft 54a is connected to the drive motor 51 without interposing a clutch between the first rotating shaft 54a and the drive motor 51. The first rotating shaft 54a is rotated by the rotational drive of the drive motor 51. The first clutch 52a is mounted on the other end of the first rotating shaft 54a.

The first clutch 52a is mounted on one end of the second rotating shaft 54b. When the first clutch 52a is made in an on state, the second rotating shaft 54b is connected to the first rotating shaft 54a and the rotational power of the first rotating shaft 54a is transmitted to the second rotating shaft 54b. Accordingly, the second rotating shaft 54b is rotated.

In addition, when the first clutch 52a is made in an off state, the connection between the second rotating shaft 54b and the first rotating shaft 54a is released and the rotational power of the first rotating shaft 54a is not transmitted to the second rotating shaft 54b. Accordingly, the second rotating shaft 54b becomes in a state in which rotation stops.

The second clutch 52b is mounted on the other end of the second rotating shaft 54b.

The third to fifth rotating shafts 54c to 54e have the same structure as the second rotating shaft 54b. The second to fifth clutches 52b to 52e are selectively mounted on the third to fifth rotating shafts 54c to 54e as illustrated in FIGS. 4 to 6 in the same manner as the mounting of the first and second clutches 52a, 52b on the second rotating shaft 54b. Specifically, the second to fifth clutches 52b to 52e are mounted on one ends of the third to fifth rotating shafts 54c to 54e, respectively. The third to fifth clutches 52c to 52e are mounted on the other ends of the third to fifth rotating shafts 54c to 54e, respectively. The fifth clutch 52e is mounted on one end of the sixth rotating shaft 54f, but any clutch for driving an extensible arm is not mounted on the other end of the sixth rotating shaft 54f. According to the above-mentioned structure, when the second to fifth clutches 52b to 52e which are mounted on one ends of the respective third to sixth rotating shafts 54c to 54f are made in an on state, the third to sixth rotating shafts 54c to 54f are connected to the second to fifth rotating shafts 54b to 54e. For example, when the third clutch 52c is made in an on state, the fourth rotating shaft 54d is connected to the third rotating shaft 54c.

Accordingly, when the second to fifth clutches 52b to 52e which are mounted on one ends of the respective third to sixth rotating shafts 54c to 54f are made in an on state, the rotational power of the second to fifth rotating shafts 54b to 54e is transmitted to the third to sixth rotating shafts 54c to 54f. Accordingly, the third to sixth rotating shafts 54c to 54f are rotated. For example, when the third clutch 52c is made in an on state, the rotational power of the third rotating shaft 54c is transmitted to the fourth rotating shaft 54c1. Accordingly, the fourth rotating shaft 54d is rotated. When the first rotating shaft 54a is rotated and the first and second clutches 52a, 52b are made in an on state during the rotation of the fourth rotating shaft 54d, the second and third rotating shafts 54b, 54c also rotate.

In addition, when the second to fifth clutches 52b to 52e mounted on one ends of the respective third to sixth rotating shafts 54c to 54f are made in an off state, the connection between the third to sixth rotating shafts 54c to 54f and the other rotating shafts is released. For example, when the third clutch 52c is made in an off state, the connection between the fourth rotating shaft 54d and the third rotating shaft 54c is released and the fourth rotating shaft 54d does not receive the rotational power of the third rotating shaft 54c. Accordingly, the fourth rotating shaft 54d becomes in a state in which rotation stops.

The first to fifth clutches 52a to 52e can transmit the power of the drive motor 51 to extensible arms which are selected among the first to sixth extensible arms 53a to 53f, so as to extend and shorten the selected extensible arms in the Y direction.

As described above, the first clutch 52a is mounted on the other end of the first rotating shaft 54a and one end of the second rotating shaft 54b. The first clutch 52a connects the other end of the first rotating shaft 54a to one end of the second rotating shaft 54b by being made in an on state. The first clutch 52a transmits the rotational power of the first rotating shaft 54a to the second rotating shaft 54b.

The first clutch 52a releases connection between the other end of the first rotating shaft 54a and one end of the second rotating shaft 54b by being made in an off state. The first clutch 52a stops transmission of the rotational power of the first rotating shaft 54a to the second rotating shaft 54b.

The second to fifth clutches 52b to 52e have the same structure as the first clutch 52a. Specifically, the second to fifth clutches 52b to 52e are selectively mounted on the other ends of the second to fifth rotating shafts 54b to 54e and one ends of the third to sixth rotating shafts 54c to 54f. The second to fifth clutches 52b to 52e connect the other ends of the two to fifth rotating shafts 54b to 54e to one ends of the third to sixth rotating shafts 54c to 54f, respectively, by being made in an on state. The second to fifth clutches 52b to 52e transmit the rotational power of the second to fifth rotating shafts 54b to 54e to the third to sixth rotating shafts 54c to 54f. For example, the third clutch 52c transmits the rotational power of the third rotating shaft 54c to the fourth rotating shaft 54d by being made in an on state. Accordingly, all of the first to third clutches 52a to 52c are made in an on state to transmit the rotational power of the first rotating shaft 54a to the fourth rotating shaft 54d through the second and third rotating shafts 54b, 54c.

The second to fifth clutches 52b to 52e release the connection between the other ends of the second to fifth rotating shafts 54b to 54e and one ends of the third to sixth rotating shafts 54c to 54f by being made in an off state. The second to fifth clutches 52b to 52e stops transmission of the rotational power of the second to fifth rotating shafts 54b to 54e to the third to sixth rotating shafts 54c to 54f.

The first to sixth sprockets 55a to 55f shorten or extend the first to sixth extensible arms 53a to 53f by winding or feeding the first to sixth extensible arms 53a to 53f.

The first sprocket 55a is mounted on the first rotating shaft 54a. One end portion of the first extensible arm 53a is mounted on the first sprocket 55a.

The first sprocket 55a is rotated with the rotation of the first rotating shaft 54a. The first sprocket 55a winds the extensible arm 53 (53a) by being rotated in a reverse direction.

Since the first sprocket 55a winds the first extensible arm 53a, the first sprocket 55a shortens the first extensible arm 53a and causes the first extensible arm 53a to be placed into the body 50a.

The first sprocket 55a feeds the first extensible arm 53a by being rotated in the normal direction. Since the first sprocket 55a feeds the first extensible arm 53a, the first sprocket 55a causes the first extensible arm 53a to go out of the body 50a and to extend. Since the first sprocket 55a causes the first extensible arm 53a to go out of the body 50a and to extend, the first sprocket 55a extends the first extensible arm 53a.

The second to sixth sprockets 55b to 55f have the same structure as the first sprocket 55a. As illustrated in FIGS. 4 to 6, the second to sixth sprockets 55b to 55f are respectively mounted on the second to sixth rotating shafts 54b to 54f. In addition, one end portions of the second to sixth extensible arms 53b to 53f are mounted on the second to sixth sprockets 55b to 55f, respectively.

When the first clutch 52a is made in an on state, the second sprocket 55b is rotated with the rotation of the first and second rotating shafts 54a, 54b. When the first and second clutches 52a, 52b are made in an on state, the third sprocket 55c is rotated with the rotation of the first to third rotating shafts 54a to 54c. When the first to third clutches 52a to 52c are made in an on state, the fourth sprocket 55d is rotated with the rotation of the first to fourth rotating shafts 54a to 54d. When the first to fourth clutches 52a to 54d are made in an on state, the fifth sprocket 55e is rotated with the rotation of the first to fifth rotating shafts 54a to 54e. When the first to fifth clutches 52a to 54e are made in an on state, the sixth sprocket 55f is rotated with the rotation of the first to sixth rotating shafts 54a to 54f. As in the case of the first sprocket 55a, the second to sixth sprockets 55b to 55f wind the second to sixth extensible arms 53b to 53f, respectively, and cause the second to sixth extensible arms 53b to 53f to be placed into the body 50a by being rotated in a reverse direction. Since the second to sixth sprockets 55b to 55f cause the second to sixth extensible arms 53b to 53f to be placed into the body 50a, the second to sixth sprockets 55b to 55f shorten the second to sixth extensible arms 53b to 53f, respectively.

The second to sixth sprockets 55b to 55f feed the second to sixth extensible arms 53b to 53f when rotating in the normal direction. Since the second to sixth sprockets 55b to 55f feed the second to sixth extensible arms 53b to 53f, the second to sixth sprockets 55b to 55f cause the second to sixth extensible arms 53b to 53f to extend out of the body 50a and extend the second to sixth extensible arms 53b to 53f.

Each of the first to sixth sprockets 55a to 55f is mounted on two rotating shafts selected from the first to sixth rotating shafts 54a to 54f so that the respective intervals between the first to sixth sprockets 55a to 55f are the same interval in the X direction orthogonal to the extending direction of the first to sixth extensible arms 53 (the Y direction). In this case, since the corrugated-board box 4 as an object to be carried is not always limited to an article having the same size, the respective intervals between the first to sixth extensible arms 53 are not limited to the same interval.

The first to sixth extensible arms 53a to 53f have the same structure, and the other end portion of each of the first to sixth extensible arms 53a to 53f is a free end.

As described above, one end portions of the first to sixth extensible arms 53a to 53f are mounted on the first to sixth sprockets 55a to 55f which are arranged at regular intervals, for example, respectively. The first to sixth extensible arms 53a to 53f are arranged in the same plane so that the respective intervals between the first to sixth extensible arms 53a to 53f are the same interval in the direction of the width 4w of the corrugated-board box illustrated in FIG. 5.

When the first to sixth sprockets 55a to 55f are rotated as described above, the first to sixth extensible arms 53a to 53f are extended and shortened in the Y direction.

In the structure of the above-mentioned robot hand device 50, the lengths of the first to sixth extensible arms 53a to 53f which are to be increased and reduced are controlled by the number of revolutions of the drive motor 51, for example. The numbers of revolutions of the first to sixth sprockets 55a to 55f are controlled by the control. The numbers of revolutions of the first to sixth sprockets 55a to 55f are controlled so that the winding lengths and the rewinding lengths of the first to sixth extensible arms 53a to 53f to be wound and rewound by the first to sixth sprockets 55a to 55f are controlled. The winding lengths and the rewinding lengths are controlled so that the lengths of the first to sixth extensible arms 53a to 53f which are to be increased and reduced are controlled.

The drive motor 51 and the first to fifth clutches 52a to 52e of the robot hand device 50 are controlled by a control device 56, which will be described below.

An example of operation of the robot hand device 50 will be described below.

In FIG. 4, the drive motor 51 is in a stop state. All of the first to fifth clutches 52a to 52e are made in an off state. In addition, all of the first to sixth extensible arms 53a to 53f are in a state in which the first to sixth extensible arms 53a to 53f are wound by the first to sixth sprockets 55a to 55f and are shortened.

A case in which the first and second extensible arms 53a, 53b extend in the Y direction as illustrated in FIG. 5 from the above-mentioned state illustrated in FIG. 4 will be described. In order to cause the first and second extensible arms 53a, 53b to extend, the first clutch 52a among the first to fifth clutches 52a to 52e is made in an on state according to the width 4w of a corrugated-board box 4 to be carried.

After the first clutch 52a is made in an on state, the drive motor 51 is rotated by the number of revolutions corresponding to the depth 4d of the corrugated-board box 4 to be carried. The first rotating shaft 54a is rotated in the normal direction by driving of the drive motor 51, and the second rotating shaft 54b is also rotated in the normal direction through the first clutch 52a.

When the second rotating shaft 54b is rotated in the normal direction together with the first rotating shaft 54a, the first and second sprockets 55a, 55b are rotated in the normal direction.

When the first and second sprockets 55a, 55b are rotated in the normal direction, the first and second extensible arms 53a, 53b wound on the first and second sprockets 55a, 55b are rewound by a length corresponding to the depth 4d of the corrugated-board box 4. The depth 4d is the length of the corrugated-board box 4 in the extending direction of the first to sixth extensible arms 53a to 53f (the Y direction). As a result, the first and second extensible arms 53a, 53b are extended to a length which can cover the depth 4d of the corrugated-board box 4 toward the lower surface of the corrugated-board box, and support the corrugated-board box 44, as illustrated in FIG. 5.

For example, all of the first to fifth clutches 52a to 52e are made in an on state to correspond to the position of a new corrugated-board box 4 as an object to be carried (hereinafter, referred to "a first position") and the width 4w of the corrugated-board box 4 as illustrated in FIG. 6 from the above-mentioned state illustrated in FIG. 4. The first position is the position of the corrugated-board box 4 in the direction in which the first to sixth extensible arms 53a to 53f are arranged at regular intervals (the X direction), and is a position where the corrugated-board box 4 closest to the sixth extensible arm 53f is disposed, for example, a center position or a corner position of the corrugated-board box 4 on an X-Y plane.

After the first to fifth clutches 52a to 52e are made in an on state, the drive motor 51 is rotated by the number of revolutions corresponding to the position of the corrugated-board box 4 to be carried (hereinafter, referred to "a second position") and to the depth 4d of the corrugated-board box 4. The first rotating shaft 54a is rotated in the normal direction by the above-mentioned rotation of the drive motor 51, and the second to sixth rotating shafts 54b to 54f are rotated in the normal direction through the first to fifth clutches 52a to 52e. The second position is a position of the corrugated-board box 4 in a direction in which the first to sixth extensible arms 53a to 53f are extended and shortened (the Y direction). The second position of the corrugated-board box 4 is a position of a front side i.e. a left side or a back side, i.e., a right side of the corrugated-board box 4 present in the box pallet 3 of the corrugated-board box, in FIG. 3.

When the second to sixth rotating shafts 54b to 54f are rotated in the normal direction together with the first rotating shaft 54a, the first to sixth sprockets 55a to 55f are rotated in the normal direction.

When the first to sixth sprockets 55a to 55f are rotated in the normal direction, the first to sixth extensible arms 53a to 53f wound on the first to sixth sprockets 55a to 55f are rewound by a rewinding length corresponding to the depth 4d of the corrugated-board box 4 and the second position of the corrugated-board box 4. As a result, the fifth and sixth extensible arms 53e, 53f are extended by a length which corresponds to the depth 4d of the corrugated-board box 4 and the second position of the corrugated-board box 4 toward the lower surface of the corrugated-board box 4, and support the corrugated-board box 4, as illustrated in FIG. 6.

The drive motor 51 is rotationally driven in a reverse direction to shorten the first and second extensible arms 53a, 53b and to cause the first and second extensible arms 53a, 53b to be placed into the body 50a, in a state in which the first and second extensible arms 53a, 53b illustrated in FIG. 5 are extended. Specifically, in a state in which the first clutch 52a is made in an on state, the drive motor 51 is rotationally driven in the reverse direction by the number of revolutions corresponding to a length by which the first and second extensible arms 53a, 53b are extended.

When the drive motor 51 is rotationally driven in the reverse direction as described above, the second rotating shaft 54b is rotated together with the first rotating shaft 54a. When the first and second rotating shafts 54a, 54b are rotated, the first and second sprockets 55a, 55b are rotated in the reverse direction by the number of revolutions corresponding to a length by which the first and second extensible arms 53a, 53b are extended.

When the first and second sprockets 55a, 55b are rotated in the reverse direction, the first and second extensible arms 53a, 53b are wound by the first and second sprockets 55a, 55b and are placed into the body 50a as illustrated in FIG. 4.

Further, likewise, the drive motor 51 is rotationally driven in the reverse direction while the first to fifth clutches 52a to 52e are maintained in an on state, in a state in which the first to sixth extensible arms 53a to 53f are extended as illustrated in FIG. 6. As a result, the first to sixth extensible arms 53a to 53f are placed into the body 50a as illustrated in FIG. 4.

Figure 7:
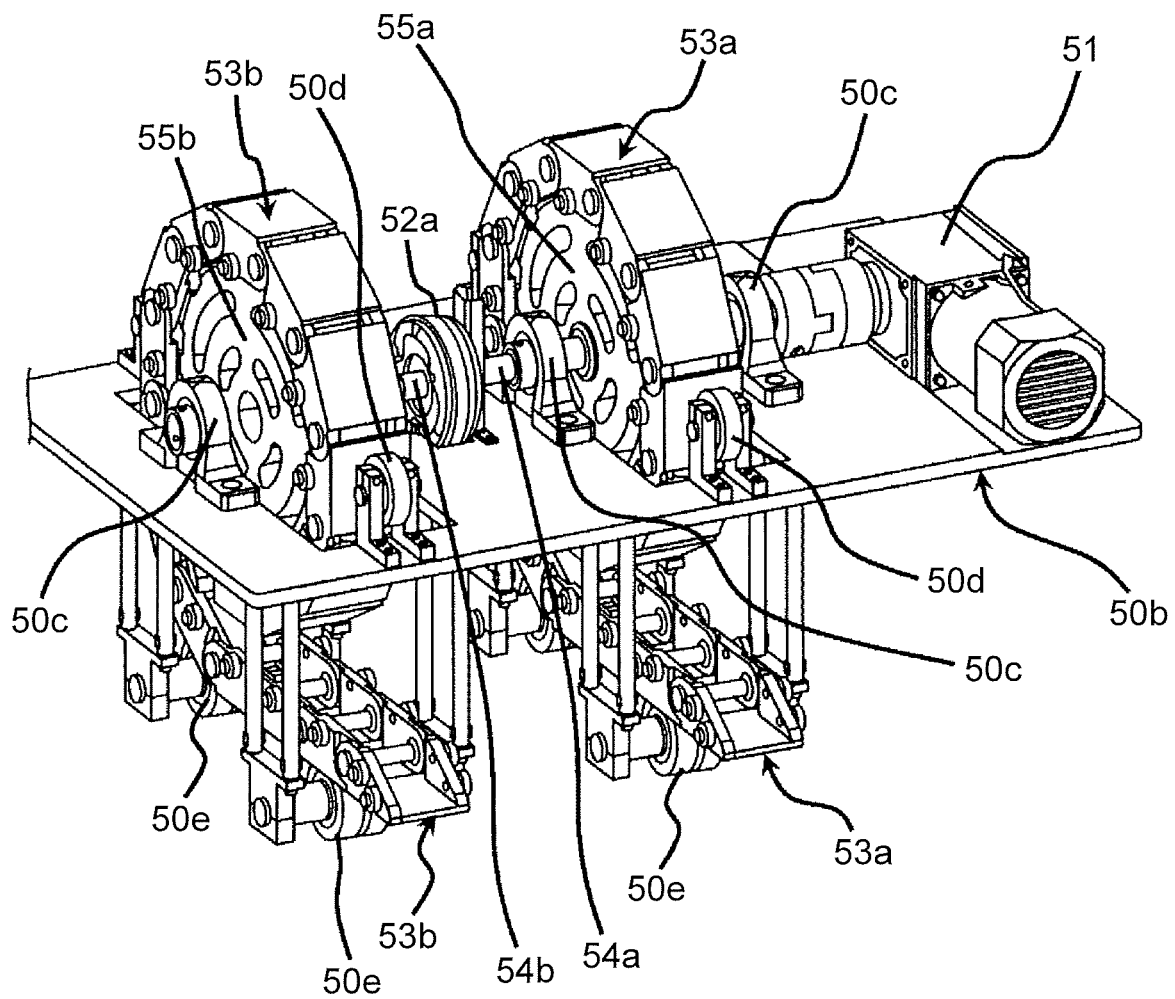
FIG. 7 is a partial enlarged perspective view of the internal structure of a body into which extensible arms of the robot hand device according to the embodiment are placed.

The specific internal structure of the body 50a will be described with reference to FIG. 7. FIG. 7 is a partial enlarged perspective view of the internal structure of the body 50a in which the extensible arms are placed. In FIG. 7, only the first and second extensible arms 53a, 53b are representatively illustrated and the third to sixth extensible arms 53c to 53f having the same structure as the first and second extensible arms 53a, 53b are omitted. Further, the second to fifth clutches 52b to 52e, the third to sixth rotating shafts 54c to 54f, and the third to sixth sprockets 55c to 55f will be omitted.

As illustrated in FIG. 7, the drive motor 51 is fixed to a support frame 50b provided in the body 50a. The first and second rotating shafts 54a, 54b are rotatably supported by bearings 50c provided on the support frame 50b.

The movement of portions of the first and second extensible arms 53a, 53b which have a chain-like structure and are wound on the first and second sprockets 55a, 55b is assisted by auxiliary rollers 50d provided on the support frame 50b. The movement of portions of the first and second extensible arms 53a, 53b which are separated from the first and second sprockets 55a, 55b is guided by guide rollers 50e.

Figure 8:
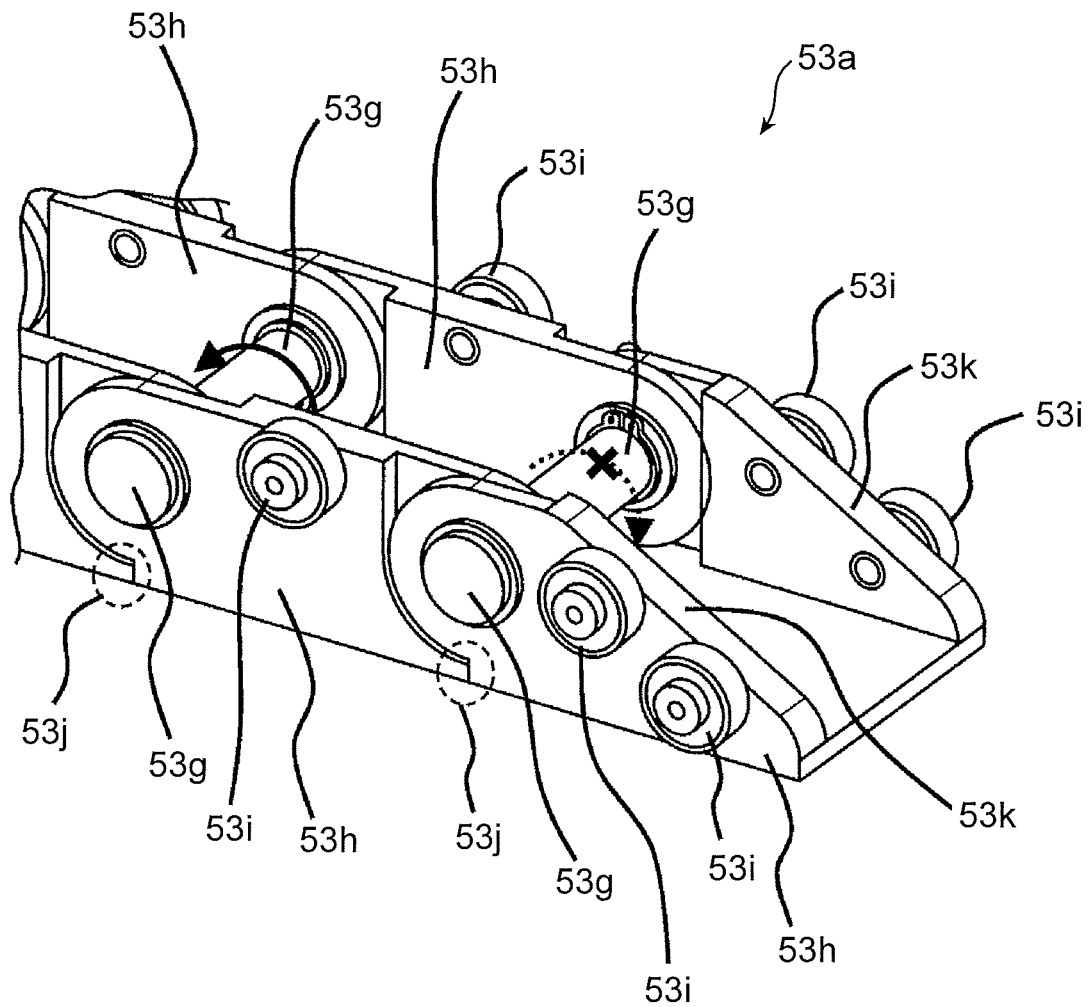
FIG. 8 is a partial enlarged perspective view of representative one of the extensible arms.
Figure 9:
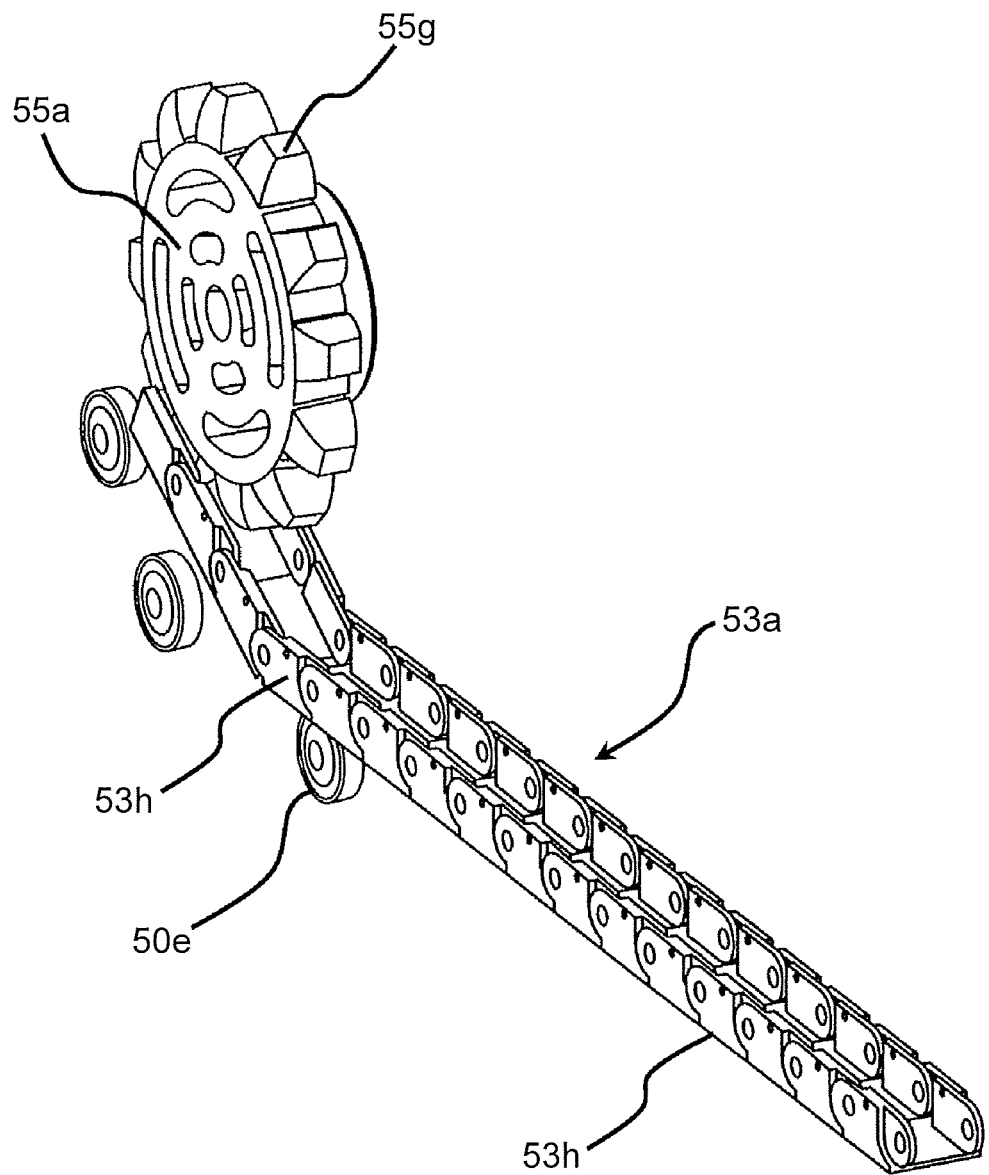
FIG. 9 is a perspective view illustrating a state in which the representative one of the extensible arms and representative one of sprockets are engaged with each other.

The specific structure of the extensible arms 53a to 53f will be described with reference to FIGS. 8 and 9. FIG. 8 is a partial enlarged perspective view of the structure of representative one of the extensible arms 53a to 53f. FIG. 9 is a perspective view illustrating a state in which representative one of the extensible arms 53a to 53f and representative one of the sprockets 55a to 55f are engaged with each other. As illustrated in FIG. 9, the extensible arm 53a as the representative one of the extensible arms includes blocks 53h which are guided by the guide rollers 50e. Each block 53h is engaged with one tooth 55g of the sprocket 55a corresponding to each block 53h.

Each block 53h has a "U"-shaped cross-sectional shape as illustrated in FIGS. 8 and 9. Each block 53h is a recessed part having a "U"-shaped cross-sectional shape as illustrated in FIG. 9, and is engaged with one tooth 55g of the sprocket 55a.

In FIG. 8, the adjacent blocks 53h are connected to each other by each shaft 53g. In addition, the blocks 53h are engaged with each other by gravity at stopper portions 53j illustrated in FIG. 8, in a state in which the blocks 53h are connected to each other. As illustrated in FIG. 8, each block 53h is rotatable about each shaft 53g in a direction of an arrow shown by a solid line, i.e., in a counterclockwise direction in FIG. 8. Each block 53h is also rotatable in the direction of an arrow shown by a dotted line, i.e., in a clockwise direction in FIG. 8. However, each stopper portion 53j works so that the rotation of each block 53h in the direction of the arrow shown by the dotted line can be prevented by the stopper portion 53j.

As illustrated in FIG. 8, each stopper portion 53j includes a protrusion formed on one block 53h and a recess formed on an adjacent block 53h. The protrusion of one block 53h comes into contact with the recess of the adjacent block 53h, and prevents rotation of each block 53h in a direction of the arrow shown by the dotted line which is caused by gravity. The rotation of each block 53h which is caused by gravity is prevented by the stopper portion. Accordingly, when the extensible arm 53a is extended or shortened, the extensible arm 53a can be straightly moved without being bent by gravity.

The block 53h which is positioned at the free end of the extensible arm 53a includes a tapered portion 53k as illustrated in FIG. 8. The extensible arm 53a includes support rollers 53i. A pair of support rollers 53i is provided on each block 53h, but two pairs of support rollers 53i are provided on the block 53h which is positioned at the free end of the extensible arm 53a. The support rollers 53i are rotatable on each block 53h, and support an object to be carried when the object is placed on the extensible arm 53a.

Figure 12:
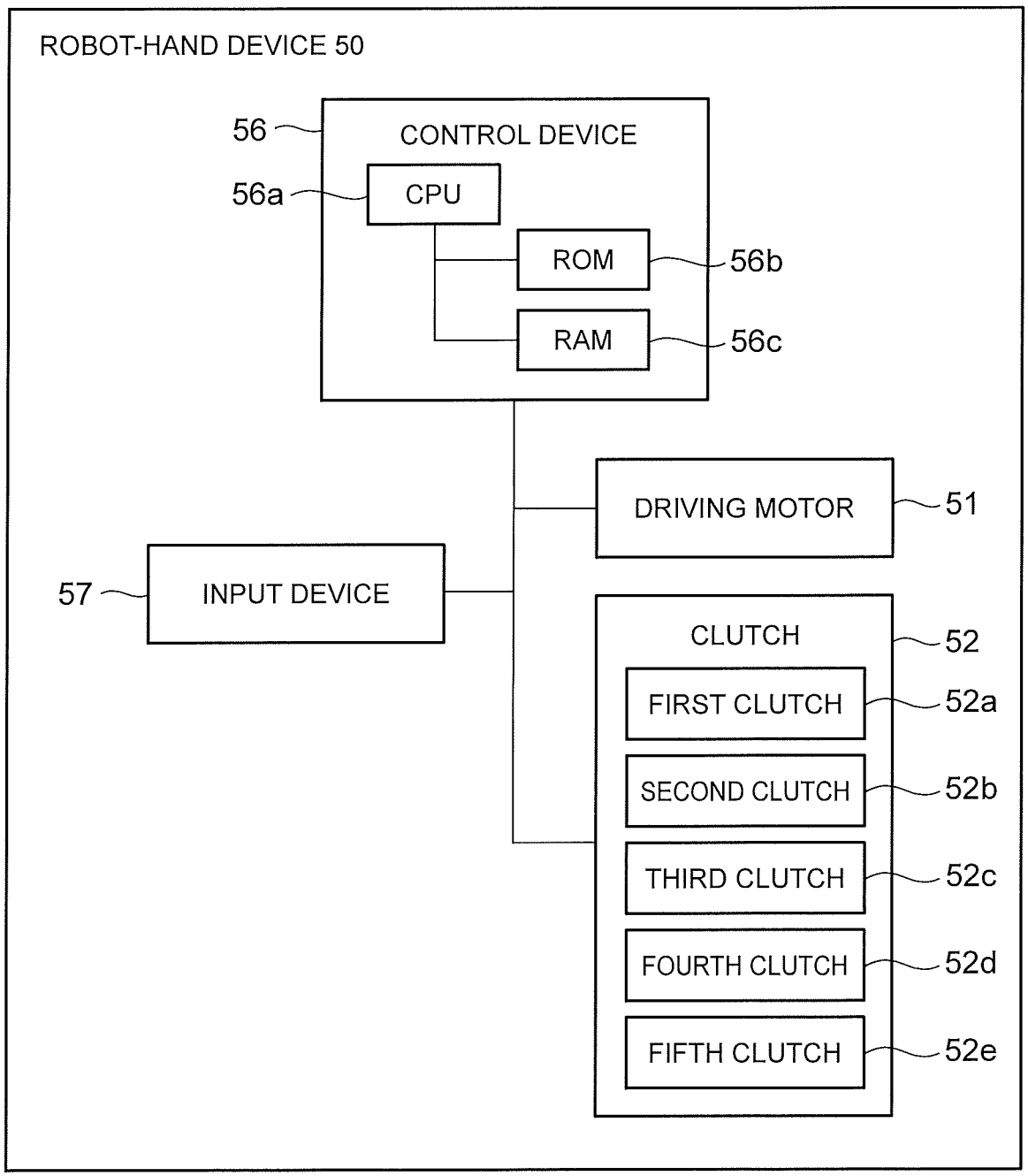
FIG. 12 is a block diagram illustrating configuration for controlling the robot hand device.

An exemplary configuration for controlling the robot hand device 50 will be described with reference to FIG. 12. FIG. 12 is a block diagram illustrating the example. The robot hand device 50 includes a control device 56 as illustrated in FIG. 12. The drive motor 51 and the first to fifth clutches 52a to 52e are connected to the control device 56. In addition, the robot hand device 50 includes an input device 57 which is connected to the control device 56.

The control device 56 includes a CPU 56a, a ROM 56b and a RAM 56c. The CPU 56a controls the drive motor 51 and the first to fifth clutches 52a to 52e.

The ROM 56b stores control programs which are used to control the drive motor 51 and the first to fifth clutches 52a to 52e.

The RAM 56c provides a work storage area which temporarily stores the control programs read out from the ROM 56b.

The input device 57 receives first and second operation instructions from the outside. The input device 57 receives the first and second operation instructions from a main control device 70 of the carrier apparatus 1, which will be described below.

The first operation instruction is an instruction for extending each of the extensible arms. The first operation instruction includes information as to the first and second positions, the width 4w and the depth 4d of the corrugated-board box 4 as an object to be carried.

The second operation instruction is an instruction for shortening each of the extensible arms.

An example of control processing which is performed by the CPU 56a according to the control programs will be described with reference to FIG. 13.

Figure 13:
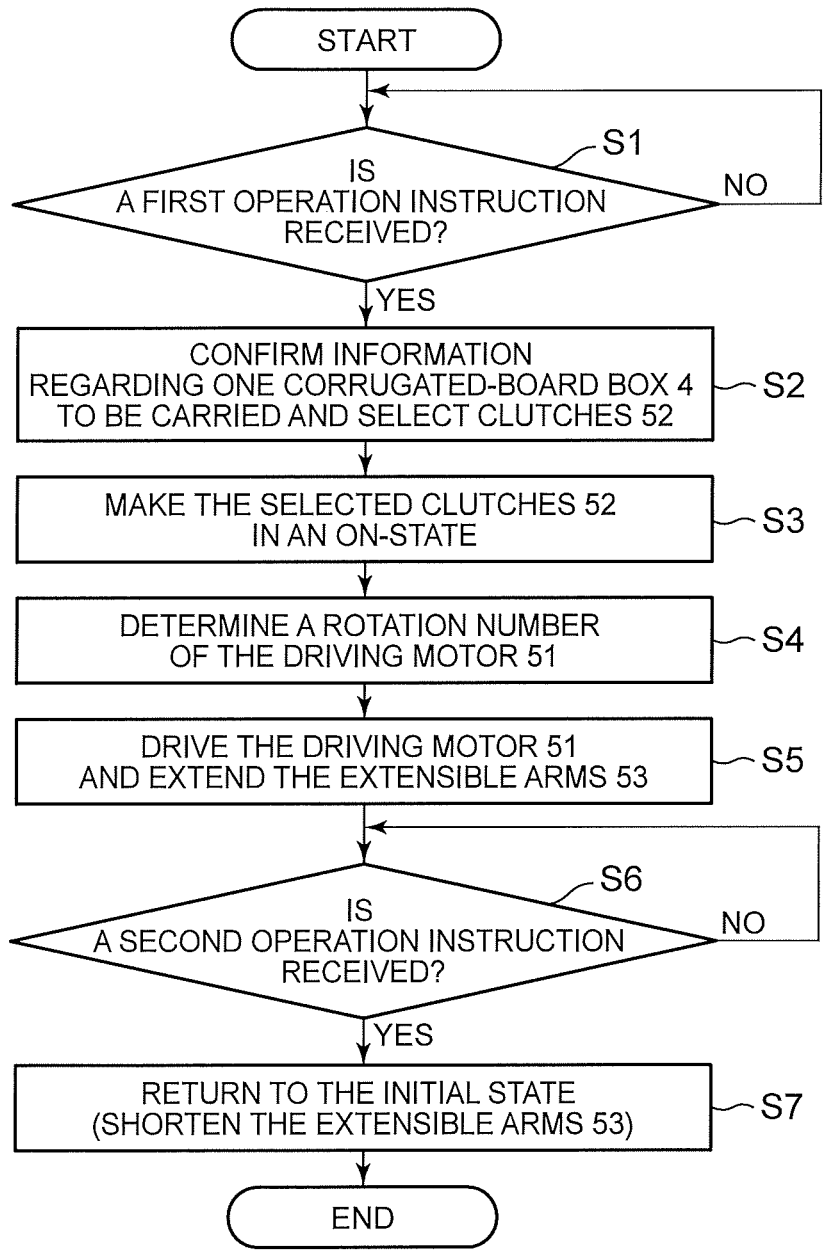
FIG. 13 is a flow chart illustrating control processing of the robot hand device.

As illustrated in FIG. 13, in Step S1, the CPU 56a waits for the reception of the first operation instruction input through the input device 57. At this time, the robot hand device 50 is in an initial state, for example. Rotation of the drive motor 51 is stopped in the initial state. In addition, all of the first to fifth clutches 52a to 52e are made in an off state in the initial state. All of the first to sixth extensible arms 53a to 53f are wound by the first to sixth sprockets 55a to 55f and are shortened. When the input device 57 receives the first operation instruction, the control processing by the CPU 56a proceeds to Step S2.

In Step S2, the CPU 56a obtains information as to the corrugated-board box 4 as an object to be carried. The information is included in the first operation instruction. The CPU 56a selects a clutch, which is to be made in an on state among the first to fifth clutches 52a to 52e, on the basis of the obtained information as to the corrugated-board box 4. Specifically, the CPU 56a selects a clutch which is to be made in an on state among the first to fifth clutches 52a to 52e, on the basis of the first position and/or the width 4w of the corrugated-board box 4.

Further, in Step S3, the CPU 56a makes only the selected clutch in an on state. For example, the CPU 56a makes the selected first clutch 52a in an on state in the case illustrated in FIG. 5. For example, the CPU 56a makes the selected first to fifth clutches 52a to 52e in an on state in the case illustrated in FIG. 6.

Then, in Step S4, the CPU 56a determines the number of revolutions of the drive motor 51 on the basis of the obtained information as to the corrugated-board box 4. Specifically, the CPU 56a determines the number of revolutions of the drive motor 51 on the basis of the first position and/or the depth 4d of the corrugated-board box 4.

Furthermore, in Step S5, the CPU 56a drives the drive motor 51 by the determined number of revolutions.

Only extensible arms which correspond to the information as to the corrugated-board box 4 and are selected among the first to sixth extensible arms 53a to 53f are extended by the control processing which is performed until Step S5 by the CPU 56a. For example, only the selected first and second extensible arms 53a, 53b are extended in the Y direction in the case illustrated in FIG. 5. The selected first to sixth extensible arms 53a to 53f are extended in the Y direction in the case illustrated in FIG. 6.

Then, in Step S6, the CPU 56a waits for reception of the second operation instruction input through the input device 57. When the input device 57 receives the second operation instruction (YES in Step S6), the control processing of the CPU 56a proceeds to Step S7.

In Step S7, the CPU 56a returns the state of the robot hand device 50 to the initial state by controlling the drive motor 51 and a necessary clutch among the first to fifth clutches 52a to 52e. Accordingly, the extended extensible arms are shortened.

The control processing which is performed by the CPU 56a is not limited to the processing illustrated in FIG. 13. The input device 57 may receive photographed images output from a camera device 30 which will be described below, in the Step S1, and the CPU 56a may obtain the information as to the corrugated-board box 4 on the basis of the photographed images in Step S2.

As described above, the robot hand device 50 according to the embodiment includes the first to sixth extensible arms 53a to 53f, the drive motor 51, and the first to fifth clutches 52a to 52e.

The first to sixth extensible arms 53a to 53f are arms which support an object to be carried and can be extended and shortened. The drive motor 51 is a drive motor which extends and shortens the extensible arms. The first to fifth clutches 52a to 52e are clutches which transmit the power of the drive motor 51 to arms selected among the first to sixth extensible arms 53a to 53f to extend and shorten the selected arms.

Thus, according to the robot hand device 50 of the embodiment, it is possible to provide a robot hand device which can carry heavy articles at high speed and can be reduced in size.

The entire structure of the carrier apparatus 1 according to the embodiment will be described with reference to FIGS. 1 and 2.

The carrier apparatus 1 is a carrier robot. As illustrated in FIGS. 1 and 2, the carrier apparatus 1 includes a robot body 10, a multijoint arm device 20, a camera device 30, a holding device 40 which holds a corrugated-board box 4, and the above-mentioned robot hand device 50.

The robot body 10 which has a box-shaped appearance is fixed to a floor, for example, and supports the multijoint arm device 20. The robot body 10 includes a main control device 70 described below which is provided in the robot body 10.

As illustrated in FIG. 2, the multijoint arm device 20 includes a first arm 21a, a second arm 21b, a third arm 21c, a fourth arm 21d, and a fifth arm 21e. The multijoint arm device 20 further includes a first joint part 22a, a second joint part 22b, a third joint part 22c, and a fourth joint part 22d.

One end of the first arm 21a is fixed to the robot body 10, and the other end of the first arm 21a is connected to one end of the second arm 21b through the first joint part 22a.

Since one end of the second arm 21b is connected to the first arm 21a through the first joint part 22a, one end of the second arm 21b is rotated about the axis of the second arm 21b as a center of rotation in a direction of an arrow of a dotted line shown in FIG. 2. Since the second arm 21b is rotated, the second arm 21b moves the holding device 40 and the robot hand device 50 including the extensible arms 53 in a direction toward the box pallet 3 in FIG. 1 and/or in a direction toward the conveyor line 2. FIG. 1 illustrates a state in which the holding device 40 and the robot hand device 50 are moved in the direction toward the box pallet 3 by rotation of the second arm 21b on the first joint part 22a in the normal direction.

The other ends of the second to fourth arms 21b to 21d are connected to one ends of the third to fifth arms 21c to 21e through the second to fourth joint parts 22b to 22d, respectively.

On the contrary, one ends of the third to fifth arms 21c to 21e are connected to the second to fourth arms 21b to 21d through the second to fourth joint parts 22b to 22d, respectively. The third to fifth arms 21c to 21e are rotated about the X direction orthogonal to the axial directions of the second to fourth arms 21b to 21d as a center of rotation, in a direction of an arrow of a dotted line shown in FIG. 2.

Since the third to fifth arms 21c to 21e are rotated as described above, the third to fifth arms 21c to 21e move the camera device 30, the holding device 40 and the robot hand device 50 in a vertical direction (the Z direction) and/or in a horizontal direction (the Y direction).

The fifth arm 21e supports the camera device 30 at the other end portion of the fifth arm 21e. The fifth arm 21e supports the holding device 40 at a lower portion of the other end portion of the fifth arm 21e. In addition, the fifth arm 21e supports the robot hand device 50 via a support arm 21g at a lower portion of the fifth arm 21e which is closer to the fourth joint part 22d than the holding device 40.

The first joint part 22a is connected to the first and second arms 21a, 21b as described above. The first joint part 22a has a first motor 23a included in a drive unit 23 for driving a rotatable joint part illustrated in FIG. 10 and described below. When the first motor 23a is rotationally driven, the first motor 23a rotates the second arm 21b with respect to the first arm 21a as described above.

The second to fourth joint parts 22b to 22d connect the second to fifth arms 21b to 21e as described above. The second to fourth joint parts 22b to 22d respectively have second to fourth motors 23b to 23d included in the drive units 23 for driving rotatable joint parts illustrated in FIG. 10 and described below. When the second to fourth motors 23b to 23d are rotationally driven, the second to fourth motors 23b to 23d rotate the third to fifth arms 21c to 21e with respect to the second to fourth arms 21b to 21d as described above.

Figure 10:
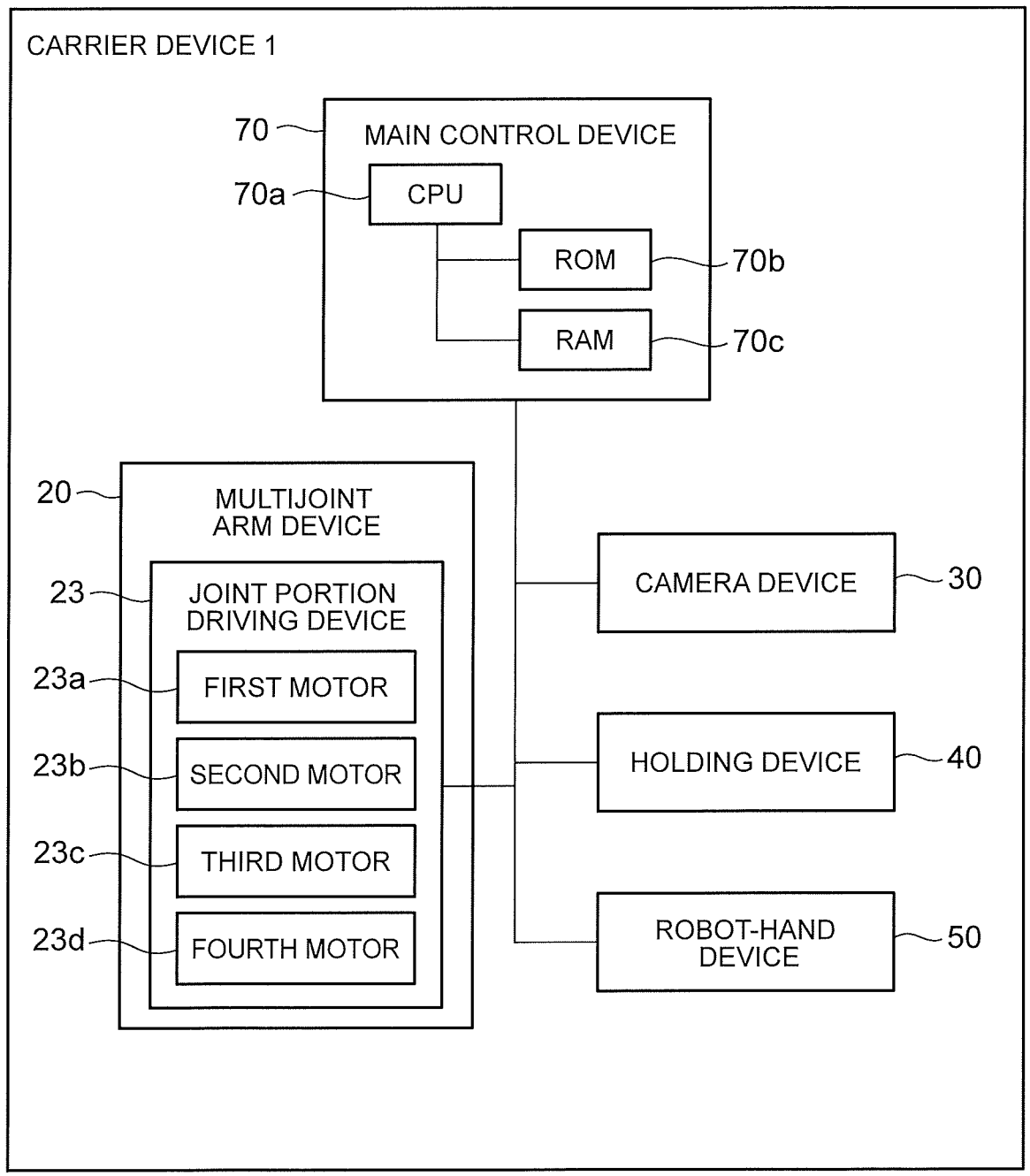
FIG. 10 is a block diagram illustrating configuration for controlling the carrier apparatus.

In the structure of the above-mentioned multijoint arm device 20, the rotational drive and the numbers of revolutions of the drive units 23 for driving the joint parts are controlled by the main control device 70 illustrated in FIG. 10 and described below.

The camera device 30 is mounted on the other end portion of the fifth arm 21e. The camera device 30 includes first and second cameras 31a, 31b, for example. The first camera 31a is moved to a predetermined first imaging position by rotation of the third to fifth arms 21c to 21e. The first camera 31a images the loading state of the corrugated-board boxes 4 seen from the upper side of the corrugated-board boxes 4 arranged in the box pallet 3 of FIG. 1, from the first imaging position.

The second camera 31b is moved to a predetermined second imaging position by rotation of the third to fifth arms 21c to 21e.

The second camera 31b images the loading state of the corrugated-board boxes 4 seen from the front side of the corrugated-board boxes 4, i.e., the side of the corrugated-board boxes 4 facing the robot hand device 50, from the second imaging position.

The camera device 30 outputs the images which are taken by the cameras 31a, 31b to the main control device 70 which is described below.

The holding device 40 is a device which holds an upper surface of the corrugated-board box 4 loaded on the box pallet 3. The holding device 40 is a suction device which holds the corrugated-board box 4 by suction of the corrugated-board box 4, using a vacuum suction method. However, the holding device 40 is not limited to a device which holds the corrugated-board box 4 by a vacuum suction method. The holding device 40 may be a device which holds a corrugated-board box 4 by gripping the corrugated-board box 4.

In FIG. 2, the holding device 40 includes two suction pads 41a, 41b. The suction pads 41a, 41b are moved to a predetermined holding position by rotation of the third to fifth arms 21c to 21e. The suction pads 41a, 41b hold the corrugated-board box 4 by sucking the upper surface of the corrugated-board box 4 at the holding position. The holding position is a position where the upper surface of the corrugated-board box 4 can be sucked.

The suction pads 41a, 41b are connected to a vacuum pump through solenoid valves (not illustrated), respectively. The holding device 40 can adjust the suction forces of the suction pads 41a, 41b according to the size or the surface state of the corrugated-board box 4.

The carrier apparatus 1 having the above-mentioned structure carries corrugated-board boxes 4 which are loaded on the box pallet 3 of FIG. 1 one by one. At first, the carrier apparatus 1 carries the corrugated-board boxes 4 placed at the uppermost stage one by one. When the carriage of the corrugated-board boxes 4 at the uppermost stage is ended, the carrier apparatus 1 carries the corrugated-board boxes 4 at the next lower stage one by one. The carrier apparatus 1 carries the corrugated-board boxes 4 placed at each stage according to a carrying order which is determined based on an arrangement pattern of the corrugated-board boxes 4 placed at the uppermost stage.

A specific example of an operation for carrying corrugated-board boxes 4 by the carrier apparatus 1 will be described below. In FIG. 1, imaging of the loading state of the corrugated-board boxes 4 which is performed by the camera device 30 is completed in advance. The robot hand device 50 shortens all of the extensible arms 53 and place the extensible arms 53 in the body 50*a* of FIG. 3. In this state, the multijoint arm device 20 faces the box pallet 3.

At least one arm of the third to fifth arms 21*c* to 21*e* is rotated on at least one joint part of the second to fourth joint parts 22*b* to 22*d* by rotational drive of at least one motor of the second to fourth motors 23*b* to 23*d* of the multijoint arm device 20. The third to fifth arms 21*c* to 21*e* are rotated until the holding device 40 mounted on the fifth arm 21*e* reaches the position of the upper surface of a corrugated-board box 4 as an object to be carried.

When the holding device 40 reaches the position of the upper surface of the corrugated-board box 4, the holding device 40 is operated to suck the upper surface of the corrugated-board box 4 by the suction pads 41*a*, 41*b*.

When the corrugated-board box 4 as an object to be carried is sucked by the holding device 40, at least one arm of the third to fifth arms 21*c* to 21*e* is rotated on at least one joint part of the second to fourth joint parts 22*b* to 22*d* by rotational drive of at least one motor of the second to fourth motors 23*b* to 23*d* again. The third to fifth arms 21*c* to 21*e* are selectively rotated until the corrugated-board box 4 sucked by the holding device 40 is lifted to a predetermined height. The predetermined height is a height of a degree that a gap which enables inserting at least the selected extensible arms 53 into the gap is formed between the corrugated-board box 4 and a corrugated-board box 4 positioned below the corrugated-board box 4.

In a state in which the corrugated-board box 4 as an object to be carried is lifted, the selected extensible arms 53 of the robot hand device 50 are extended in the Y direction as described above and are inserted into the gap. The selected extensible arms 53 support the lower surface of the lifted corrugated-board box 4 by being inserted into the gap.

In a state in which the corrugated-board box 4 as an object to be carried is sucked by the holding device 40 and is supported by the selected extensible arms 53, at least one arm of the third to fifth arms 21*c* to 21*e* is rotated on at least one joint part of the second to fourth joint parts 22*b* to 22*d* by rotational drive of at least one motor of the second to fourth motors 23*b* to 23*d* again. The third to fifth arms 21*c* to 21*e* are selectively rotated until the corrugated-board box 4 goes out of the box pallet 3.

When the corrugated-board box 4 goes out of the box pallet 3, the second arm 21*b* is rotated on the first joint part 22*a* in the reverse direction by the rotational drive of the first motor 23*a* of the multijoint arm device 20 in the reverse direction. The second arm 21*b* is rotated in the reverse direction until the multijoint arm device 20 faces the conveyor line 2 of FIG. 1.

Since the multijoint arm device 20 faces the conveyor line 2, the corrugated-board box 4 which is sucked by the holding device 40 and is supported by the selected extensible arms 53 is carried to the conveyor line 2.

When the corrugated-board box 4 is carried to the conveyor line 2, at least one arm of the third to fifth arms 21*c* to 21*e* is rotated on at least one joint part of the second to fourth joint parts 22*b* to 22*d* by the rotational drive of at least one motor of the second to fourth motors 23*b* to 23*d* again. The third to fifth arms 21*c* to 21*e* are rotated until the corrugated-board box 4 which is sucked by the holding device 40 and is supported by the selected extensible arms 53 is carried to a position above the conveyor line 2.

Subsequently, the selected extensible arms 53 of the robot hand device 50 are shortened. When the shortening of the selected extensible arms 53 is completed, the corrugated-board box 4 becomes in a state in which the corrugated-board box 4 is lifted by the holding device 40 only at a position above the conveyor line 2.

In this state, at least one arm of the third to fifth arms 21*c* to 21*e* is rotated on at least one joint part of the second to fourth joint parts 22*b* to 22*d* by rotational drive of at least one motor of the second to fourth motors 23*b* to 23*d* again. The third to fifth arms 21*c* to 21*e* are selectively rotated until the corrugated-board box 4 as an object to be carried is placed on the conveyor line 2.

When the corrugated-board box 4 is placed on the conveyor line 2, the holding device 40 is stopped. As a result, the suction of the corrugated-board box 4 is released so that the corrugated-board box 4 is separated from the suction pads 41*a*, 41*b*. The carriage of the corrugated-board box 4 as an object to be carried to the conveyor line 2 from the box pallet 3 is completed by the above processes.

When the corrugated-board boxes 4 as objects to be carried remain on the box pallet 3 in the state, the second arm 21*b* is rotated on the first joint part 22*a* in the normal direction by rotational drive of the first motor 23*a* of the multijoint arm device 20 in the normal direction in order to carry these corrugated-board boxes 4. The second arm 21*b* is rotated in the normal direction until the multijoint arm device 20 faces the box pallet 3 in FIG. 1. When the multijoint arm device 20 faces the box pallet 3, the carrier apparatus 1 repeats the above carrying operation until any corrugated-board box as an object to be carried is not present on the box pallet 3.

A configuration for controlling the carrier apparatus 1 will be described with reference to FIG. 10. FIG. 10 is a block diagram illustrating a configuration for controlling the carrier apparatus 1. The carrier apparatus 1 includes the main control device 70 as described above. The multijoint arm device 20, the camera device 30, the holding device 40 and the robot hand device 50 which are illustrated in FIGS. 1 and 2 are connected to the main control device 70.

The main control device 70 includes a CPU 70*a*, a ROM 70*b*, and a RAM 70*c*. The CPU 70*a* controls the multijoint arm device 20 to move the camera device 30 to the first and second imaging positions.

Further, the CPU 70*a* controls the multijoint arm device 20 to move the holding device 40 to the holding position.

The CPU 70*a* controls the multijoint arm device 20 to carry the corrugated-board box 4 as an object to be carried which is sucked by the holding device 40 and is supported by the robot hand device 50, to the conveyor line 2.

The CPU 70*a* controls the camera device 30 which is moved to the first and second imaging positions.

The CPU 70*a* controls the holding device 40 which is moved to the holding position. The CPU 70*a* controls the holding device 40 so that the holding device 40 releases the suction of the corrugated-board box 4 on the conveyor line 2.

In addition, the CPU 70*a* acquires a photographed image output from the first camera 31*a* of the camera device 30 as described above.

The photographed image includes information representing a loading state of the corrugated-board boxes 4 onto the box pallet 3 seen from the upper side of the box pallet 3, i.e., the upper side in the Z direction of FIG. 1.

The photographed image which is output from the second camera 31*b* of the camera device 30 includes information representing the loading state of the corrugated-board boxes 4 in the box pallet 3 seen from the front side of the corrugated-board boxes 4, i.e., the side of the box pallet 3 facing the carrier apparatus 1 in the Y direction in FIG. 1.

The CPU 70*a* obtains an arrangement pattern of the corrugated-board boxes 4 placed at at least the uppermost stage of the box pallet 3, on the basis of the photographed images which are acquired from the first and second cameras 31*a*, 31*b* of the camera device 30. The CPU 70*a* determines a carrying order of the corrugated-board boxes 4 in the box pallet 3 on the basis of the arrangement pattern of the corrugated-board boxes 4.

The CPU 70*a* obtains the information as to the corrugated-board box 4 as an object to be carried, on the basis of the photographed images. Specifically, the CPU 70*a* obtains the first position of the corrugated-board box 4 in the X direction, the second position of the corrugated-board box 4 in the Y direction, and the width 4*w* and the depth 4*d* of the corrugated-board box 4 as information as to the corrugated-board box 4, on the basis of the photographed images.

The CPU 70*a* outputs the first and second operation instructions for extending and shortening the extensible arms 53 to the robot hand device 50 to control the robot hand device 50. The CPU 70*a* outputs the first operation instruction which includes the information as to the corrugated-board box 4 to the robot hand device 50 according to the carrying order. The CPU 70*a* outputs the second operation instruction for shortening the extensible arms 53 to the robot hand device 50 whenever the carriage of each one corrugated-board box 4 is completed.

The ROM 70*b* stores control programs which are used to control the multijoint arm device 20, the camera device 30, the holding device 40, and the robot hand device 50.

The ROM 70*b* previously stores reference arrangement patterns of the corrugated-board boxes 4 of the uppermost stage in the box pallet 3, and an optimum carrying order of the corrugated-board boxes 4 for each of these reference arrangement patterns. The CPU 70*a* compares the arrangement pattern which is obtained on the basis of the photographed images with the reference arrangement patterns that are stored in the ROM 70*b*, and determines a carrying order corresponding to the reference arrangement pattern which corresponds to the obtained arrangement pattern, as the carrying order of the corrugated-board boxes 4.

RAM 70*c* provides a work storage area which temporarily stores the control programs read out from the ROM 70*b*.

An example of control processing which is performed by the CPU 70*a* according to the control programs will be described with reference to FIG. 11.

Figure 11:
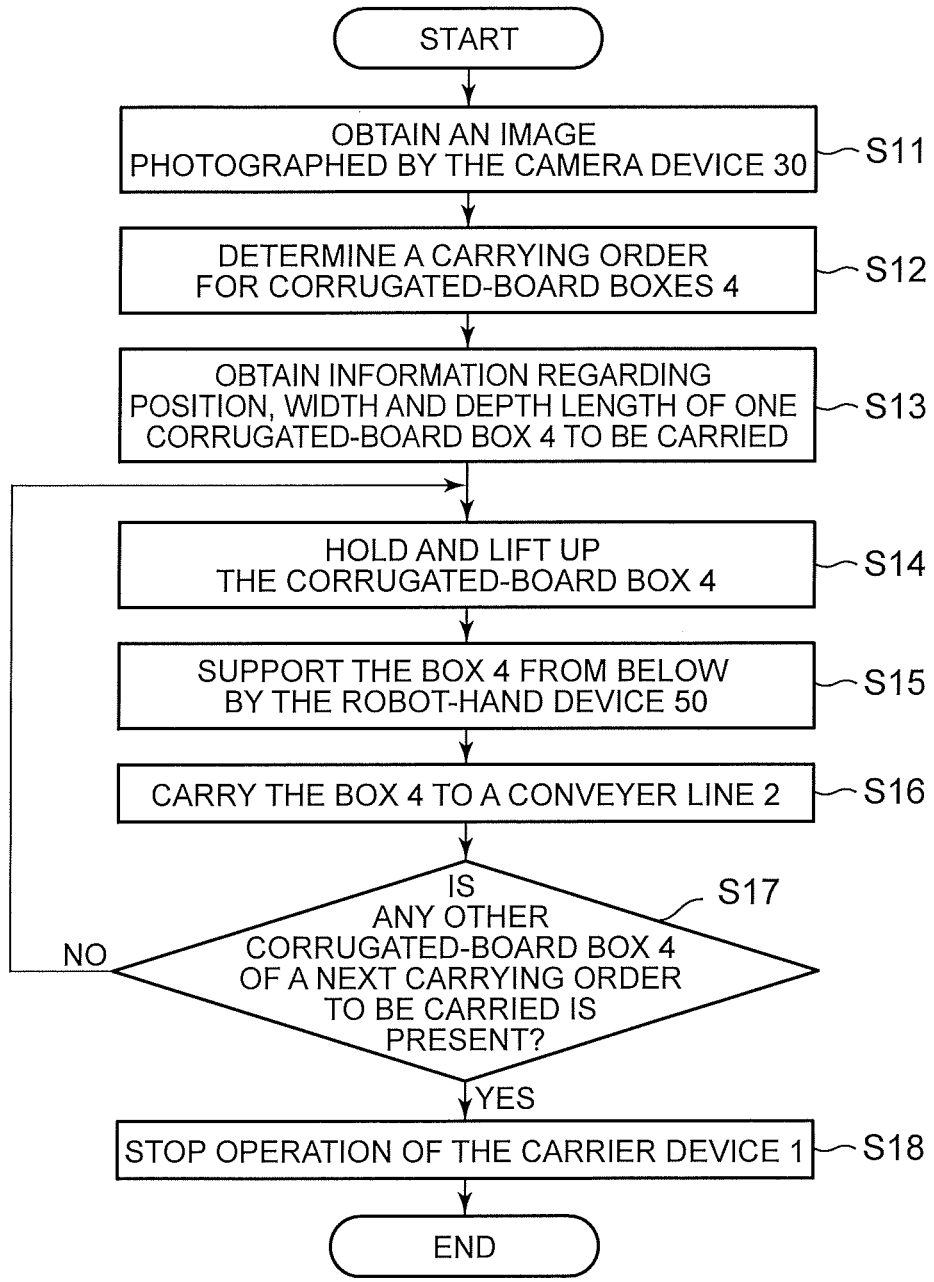
FIG. 11 is a flow chart illustrating control processing of the carrier apparatus.

As illustrated in FIG. 11, in Step S11, the CPU 70*a* acquires photographed images, which include information representing a loading state of the corrugated-board boxes 4, by using the camera device 30 illustrated in FIGS. 1 and 2.

Specifically, the CPU 70*a* drives the drive unit 23 for moving the joint part of the multijoint arm device 20 to move the camera device 30 to the first and second imaging positions. As described above, the first imaging position is a position at which the loading state of the corrugated-board boxes 4 seen from the upper side of the corrugated-board boxes 4 in the box pallet 3 of FIG. 1 is imaged. The second imaging position is a position at which the loading state of the corrugated-board boxes 4 seen from the front side of the corrugated-board boxes 4, i.e., the side of the corrugated-board boxes 4 facing the robot hand device 50 is imaged.

The CPU 70*a* acquires photographed images by operating the camera device 30 at the first and second imaging positions.

Subsequently, in Step S12, the CPU 70*a* determines a carrying order of the corrugated-board boxes 4 present in the box pallet 3.

Specifically, the CPU 70*a* obtains the arrangement pattern of the corrugated-board boxes 4 of the uppermost stage present in the box pallet 3 on the basis of the photographed images. The CPU 70*a* determines the carrying order of the corrugated-board boxes 4 through the comparison of the obtained arrangement pattern with the reference arrangement patterns which are stored in the ROM 70*b*.

Further, in Step S13, the CPU 70*a* obtains the first position of each corrugated-board box 4 present in the box pallet 3 in the X direction, the second position of each corrugated-board box 4 in the Y direction, and the width 4*w* and the depth 4*d* of each corrugated-board box 4 on the basis of the photographed images.

Then, in Step S14, the CPU 70*a* holds the first corrugated-board box 4 of the carrying order, and lifts the held corrugated-board box 4 by a predetermined height to support the lower surface of the corrugated-board box 4 by the extensible arms 53 of the robot hand device 50.

Specifically, the CPU 70*a* moves the holding device 40 to the holding position of the first corrugated-board box 4 on the basis of the obtained second position of the corrugated-board box 4 in the Y direction. The CPU 70*a* drives the drive unit 23 for the joint part of the multijoint arm device 20 to move the holding device 40 to the holding position.

In addition, the CPU 70*a* sucks the upper surface of the corrugated-board box 4 and holds the corrugated-board box 4 by operating the holding device 40 at the holding position. The CPU 70*a* drives the drive unit 23 for moving the joint part of the multijoint arm device 20 to lift the held corrugated-board box 4 by a predetermined height.

Subsequently, in Step S15, the CPU 70*a* drives the robot hand device 50 to support the lower surface of the corrugated-board box 4 which is lifted by the predetermined height by the extensible arms 53 of the robot hand device 50.

Specifically, the CPU 70*a* outputs the first operation instruction to the robot hand device 50 to drive the robot hand device 50.

As described above, the robot hand device 50 extends the extensible arms 53 in the Y direction on the basis of the first operation instruction, and supports the lower surface of the corrugated-board box 4.

Subsequently, in Step S16, the CPU 70*a* carries the corrugated-board box 4 which is sucked by the holding device 40 and is supported by the robot hand device 50, to the conveyor line 2. For this purpose, the CPU 70*a* drives the drive unit 23 for moving the joint part of the multijoint arm device 20.

When the corrugated-board box 4 reaches the conveyor line 2, the CPU 70*a* drives the robot hand device 50 so as to release the support of the corrugated-board box 4 performed by the robot hand device 50.

Specifically, the CPU 70*a* outputs the second operation instruction to the robot hand device 50 to drive the robot hand device 50.

As described above, the robot hand device 50 shortens the extensible arms 53 on the basis of the second operation instruction, and releases the support of the corrugated-board box 4.

In addition, the CPU 70*a* drives the drive unit 23 for moving the multijoint arm device 20 so that the corrugated-board box 4 the support of which is released and which is supported by the holding device 40 only is loaded onto the conveyor line 2.

When the corrugated-board box 4 is placed on the conveyor line 2, the CPU 70*a* stops the operation of the holding device 40.

Then, in Step S17, the CPU 70a determines whether or not a corrugated-board box 4 corresponding to the next carrying order is present. For example, the CPU 70a determines whether or not the corrugated-board box 4 carried to the conveyor line 2 is one corresponding to the final carrying order of the determined carrying order.

If the corrugated-board box 4 carried to the conveyor line 2 is not one corresponding to the final carrying order ("NO" in Step S17), the control processing of the CPU 70a returns to Step S14.

If the corrugated-board box 4 carried to the conveyor line 2 is one corresponding to the final carrying order ("YES" in Step S17), the control processing of the CPU 70a proceeds to Step S18.

In Step S18, the CPU 70a stops the operation of the carrier apparatus 1.

The control processing which is performed by the CPU 70a is not limited to the processing illustrated in FIG. 11. For example, in Step S15 and Step S16, the CPU 70a may directly drive and control the drive motor 51 and the clutches 52 of the robot hand device 50. In this case, the control device 56 of the robot hand device 50 can be omitted.

As described above, the carrier apparatus 1 which is a carrier robot according to the embodiment includes the holding device 40, the robot hand device 50, and the main control device 70.

The holding device 40 holds the upper surface of a corrugated-board box 4 which is an object to be carried. The robot hand device 50 supports the lower surface of the corrugated-board box 4. The main control device 70 controls the operation of the holding device 40 and the operation of the robot hand device 50 so as to support the lower surface of the corrugated-board box 4 by the robot hand device after holding the upper surface of the corrugated-board box 4 by the holding device 40.

According to the embodiment, heavy articles can be carried at high speed and the device can be reduced in size.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. The embodiments described herein may be embodied in a form a combination of some of the embodiments.

What is claimed is:

1. A robot hand device comprising:
extensible arms which support an object and are capable of being extended and shortened in a first direction;
sprockets provided for the respective extensible arms to be arranged respectively in a second direction perpendicular to the sprockets and to extend and shorten the extensible arms by winding or feeding the extensible arms;
a drive motor;
rotating shafts which are driven by the drive motor to drive the sprockets; and
clutches which are capable of transmitting power of the motor to the extensible arms selected among the extensible arms to be extended and shortened, wherein
each of ones of the rotating shafts, each clutch, each of other ones of the rotating shafts, and each sprocket are connected in that order in the second direction, and the extensible arms are provided in a same plane at intervals in a width direction of the object and are extended and shortened in a direction crossing the width direction of the object.

2. The robot hand device according to claim 1, wherein each of the extensible arms includes blocks, adjacent ones of the blocks being connected to each other by a shaft.

3. The robot hand device according to claim 1, wherein the at least one clutch transmits power of the motor to at least one of the extensible arms which is selected among the extensible arms according to a width of the object.

4. The robot hand device according to claim 1, wherein the at least one clutch transmits power of the motor to the at least one of extensible arms which are selected among the extensible arms according to a position of the object in a direction parallel to a width direction of the object.

5. The robot hand device according to claim 1, wherein the extensible arms to be selected are at least two or more extensible arms.

6. A carrier apparatus comprising:
a holding device which holds an object to be carried and can carry the object in a vertical direction and a horizontal direction;
a robot hand device according to claim 1 which supports a lower surface of the object; and
a control device which controls operations of the holding device and the robot hand device so as to support the lower surface of the object by the robot hand device after holding the object by the holding device.

7. The carrier apparatus according to claim 6, further comprising an multijoint arm, wherein the multijoint arm moves the holding device and the robot hand device.

8. The carrier apparatus according to claim 7, wherein the control device controls to move the holding device to a predetermined holding position at which the object is capable of being held, by controlling operation of the multijoint arm.

9. The carrier apparatus according to claim 6, wherein the control device makes the robot hand device support the lower surface of the object by controlling the operation of the robot hand device, after lifting the object which is held by the holding device by a predetermined height by controlling an operation of the multijoint arm.

10. The carrier apparatus according to claim 6, further comprising a camera device, wherein the camera device obtains a photographed image of a loading state of the object in a conveying carriage on which the object is loaded.

11. The carrier apparatus according to claim 10, wherein the control device controls operation of the robot hand device on the basis of information relating to the width of the object and the position of the object obtained from a photographed image which is output from the camera device.

12. The carrier apparatus according to claim 10, wherein the control device determines a carrying order of the object which is to be carried from the conveying carriage by the holding device and the robot hand device, on the basis of an arrangement pattern of the object obtained from a photographed image which is output from the camera device.

13. The carrier apparatus according to claim 12, further comprising a memory, wherein the memory stores reference arrangement patterns of the object and carrying orders according to the reference arrangement patterns previously, and the control device determines a carrying order through a comparison of an arrangement pattern obtained from the photographed image and the reference arrangement patterns stored in the memory.

* * * * *